US012008428B2

(12) United States Patent
Tsai et al.

(10) Patent No.: US 12,008,428 B2
(45) Date of Patent: *Jun. 11, 2024

(54) SYSTEM AND METHOD FOR A NEAR FIELD COMMUNICATIONS READER DEVICE

(71) Applicant: Stripe, Inc., South San Francisco, CA (US)

(72) Inventors: Hwai Sian Tsai, Tsuen Wan (HK); Chi Wah Lo, Tsuen Wan (HK)

(73) Assignee: STRIPE, INC., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,522

(22) Filed: May 26, 2023

(65) Prior Publication Data

US 2023/0297789 A1 Sep. 21, 2023

Related U.S. Application Data

(63) Continuation of application No. 17/591,677, filed on Feb. 3, 2022, now Pat. No. 11,714,974, which is a
(Continued)

(51) Int. Cl.
*G06K 7/10* (2006.01)
(52) U.S. Cl.
CPC ..... *G06K 7/10297* (2013.01); *G06K 7/10316* (2013.01)
(58) Field of Classification Search
CPC .............. G06K 7/10297; G06K 7/10316
See application file for complete search history.

(56) References Cited

U.S. PATENT DOCUMENTS

| 9,129,166 B2 | 9/2015 | Lo et al. |
| 9,489,548 B2 | 11/2016 | Lo et al. |

(Continued)

FOREIGN PATENT DOCUMENTS

| CN | 101233664 A | 7/2008 |
| CN | 102136170 A | 7/2011 |

(Continued)

OTHER PUBLICATIONS

Intellectual Property Administration, PRC; The First Office Action of CN Application No. 201510772234.2; (related application); dated Feb. 3, 2019; 19 pages (including translation).
(Continued)

*Primary Examiner* — Jamara A Franklin
(74) *Attorney, Agent, or Firm* — Womble Bond Dickinson (US) LLP

(57) ABSTRACT

A reader device for attachment to a smart device comprising a display, the reader comprising an antenna, processing and reading circuitry, and a communications module, wherein the antenna, the processing and reading circuitry, the processor and the communications module are coupled to each other, and whereby the antenna encloses said display. When a card is tapped on the display, the antenna receives a signal and transmits the signal to the processing and reading circuitry. The processing and reading circuitry processes the signal to produce data, and the produced data is transmitted to a device external to the reader device by the communications module.

20 Claims, 5 Drawing Sheets

Related U.S. Application Data continuation of application No. 17/089,352, filed on Nov. 4, 2020, now Pat. No. 11,256,885, which is a continuation of application No. 16/386,226, filed on Apr. 16, 2019, now Pat. No. 10,832,019.

(60) Provisional application No. 62/661,152, filed on Apr. 23, 2018.

(56) References Cited

U.S. PATENT DOCUMENTS

| | | |
|---|---|---|
| 2006/0157566 A1 | 7/2006 | Kawasaki et al. |
| 2009/0102419 A1 | 4/2009 | Gwon et al. |
| 2012/0139358 A1 | 6/2012 | Teggatz et al. |
| 2012/0299390 A1 | 11/2012 | Kim et al. |
| 2013/0095754 A1 | 4/2013 | Moreton et al. |
| 2013/0175874 A1 | 7/2013 | Lou et al. |
| 2014/0111389 A1 | 4/2014 | Jung |
| 2014/0217174 A1 | 8/2014 | Lo et al. |
| 2015/0347790 A1 | 12/2015 | Lo et al. |

FOREIGN PATENT DOCUMENTS

| | | |
|---|---|---|
| CN | 202522710 U | 11/2012 |
| CN | 103220020 A | 7/2013 |
| CN | 103378880 A | 10/2013 |
| CN | 103779647 A | 5/2014 |
| CN | 105824359 A | 8/2016 |
| CN | 106058425 A | 10/2016 |
| IN | 107133791 A | 9/2017 |

OTHER PUBLICATIONS

Intellectual Property Administration, PRC; The First Office Action of CN Application No. 201980027548.6; (related application); dated Apr. 6, 2021; 24 pages (including translation).

Intellectual Property Administration, PRC; The Second Office Action of CN Application No. 201510772234.2; (related application); dated Oct. 18, 2019; 8 pages (including translation).

Intellectual Property Administration, PRC; The Third Office Action of CN Application No. 201510772234.2; (related application); dated May 7, 2020; 21 pages (including translation).

International Preliminary Report on Patentability received for PCT Patent Application No. PCT/CN2019/083891, dated Nov. 5, 2020, 6 pages.

International Search Report and Written Opinion received for PCT Patent Application No. PCT/CN2019/083891, dated Aug. 5, 2019, 7 pages.

National Intellectual Property Administration, PRC: Notification to Grant Patent Right for Invention of CN Application No. 2019800275486 (related application); dated Feb. 25, 2022; 2 pages (including English translation).

Notification to Grant Patent Right for Invention received for Chinese Patent Application No. 201980027548.6, dated Feb. 25, 2022, 3 pages (2 pages of English Translation and 1 page of Original Document).

Office Action received for Chinese Patent Application No. 201980027548.6, dated Apr. 6, 2021, 20 pages (11 pages of English Translation and 9 pages of Original Document).

PCT: International Search Report and Written Opinion of PCT/CN2019/083891 (related application); dated Aug. 5, 2019; 9 pages.

The second Office Action received for Chinese Patent Application No. 201980027548.6, dated Oct. 25, 2021, 7 pages (4 pages of English Translation and 3 pages of Original Document).

SYSTEM AND METHOD FOR A NEAR FIELD COMMUNICATIONS READER DEVICE

CROSS-REFERENCE TO RELATED APPLICATIONS

This application is a continuation of U.S. patent application Ser. No. 17/591,677, filed Feb. 3, 2022, entitled SYSTEM AND METHOD FOR NEAR FIELD COMMUNICATIONS READER DEVICE, which is a continuation of U.S. patent application Ser. No. 17/089,352, filed Nov. 4, 2020, entitled SYSTEM AND METHOD FOR NEAR FIELD COMMUNICATIONS READER DEVICE, which is a continuation of U.S. patent application Ser. No. 16/386,226, filed Apr. 16, 2019, entitled SYSTEM AND METHOD FOR A NEAR FIELD COMMUNICATIONS READER DEVICE, now U.S. Pat. No. 10,832,019, issued Nov. 10, 2020, which claims the benefit of U.S. Provisional Application No. 62/661,152, filed on Apr. 23, 2018, entitled SYSTEM AND METHOD FOR A NEAR FIELD COMMUNICATIONS READER DEVICE, the specifications of which are incorporated by reference in their entirety.

TECHNICAL FIELD

This application relates to the field of near field communication (NFC) readers for smart devices and mobile devices.

BACKGROUND

Many smart devices such as smartphones, tablets, or other electronic devices have integrated Near Field Communications (NFC), and/or Radio Frequency Identification (RFID), and/or Europay Mastercard Visa (EMV) capability. However, most NFC/RFID/EMV devices have an NFC/RFID/EMV antenna on the back or non-display side of the device. This is desirable for most consumer applications, which usually involve tapping an electronic wallet or "e-wallet" to a merchant's card reader to make mobile payments.

However, there are some cases where it is preferable for the NFC/RFID/EMV antenna to be located on the front or display side. It would be even more preferable for the NFC/RFID/EMV antenna to be located such that the customer can tap the screen of the smart device with a payment card. This is useful in the case where the merchant uses a tablet to acquire an e-wallet payment.

In addition, the performance requirement of the NFC/RFID/EMV functionalities is not always a critical design goal in smart device design. Typically, most smart device users use NFC/RFID/EMV technology for card emulation and peer-to-peer communication with other devices, and not to read "passive" cards, that is, cards which are powered by NFC electromagnetic waves and do not have batteries. Also, mobile phone manufacturers typically want devices such as smartphones to be compact and look appealing to a consumer.

This is at odds with the requirements for merchants to handle payments. Typically a merchant requires a payment device to be able to read all cards, including, for example, passive cards, active cards and emulated cards. As a consequence, the interoperability requirements for merchant devices to handle payment via NFC/RFID/EMV are often more stringent. To ensure the interoperability of card acceptance devices and finance cards, EMVCo has defined the specification of an industrial standard called EMV Contactless L1.

Furthermore, many older smart devices do not have NFC capabilities. Therefore there is a need to upgrade the capabilities of these older smart devices.

There are dongle devices to connect with smart devices to provide NFC/RFID/EMV card acceptance interface on the front side. However, these dongles are designed such that the user taps the card on the dongle, not on the smart device screen. This is not always ideal for a merchant.

There are also works which detail systems and methods to integrate NFC antennas with smart device screens so as to enable reading from the front side. These include, for example:

- US Patent Application Publication No. 2013/0229362 to Liu et al filed Apr. 24, 2012;
- US Patent Application Publication No. 2013/0196596 to Parekh et al filed Jan. 27, 2012;
- US Patent Application Publication No. 2011/0273382 to Yoo et al filed Jul. 9, 2010;
- US Patent Application Publication No. 2017/0179567 to Zou et al filed Jan. 29, 2016;
- US Patent Application Publication No. 2014/0080411 to Konanur et al filed Dec. 20, 2012;
- US Patent Application Publication No. 2015/0062853 to Li et al filed Sep. 29, 2014; and
- US Patent Application Publication No. 2016/0365620 to Que et al filed Aug. 26, 2016.

However, these systems and methods have been created without taking into account the needs of merchants, which as explained before are often more stringent than consumers. Furthermore, these solutions concern integration of the NFC antenna with the smart device screen at the time of manufacture. These solutions are therefore not applicable to cases where there is a need to upgrade the NFC capabilities of older smart devices.

Therefore there is a need for a solution to enable merchants to receive card payments from consumers via tapping cards on a smart device screen; and to be able to upgrade older smart devices so as to improve this capability. The solution must be compliant with payment industry standards so as to meet the requirements of merchants.

SUMMARY

An embodiment provides a reader device for attachment to a smart device comprising a display. Said reader device comprises an antenna, processing and reading circuitry, and a communications module, wherein said antenna, said processing and reading circuitry, said processor and said communications module are coupled to each other, and whereby said antenna encloses said display; wherein, when a card is tapped on said display, said antenna receives a signal and transmits said signal to said processing and reading circuitry, said processing and reading circuitry processes said signal to produce data, and said produced data is transmitted to a device external to said reader device by said communications module.

Another embodiment provides a method to perform reading for a smart device comprising a display. Said method comprises providing an reader device comprising an antenna, processing and reading circuitry, and a communications module, wherein said antenna, said processing and reading circuitry\ and said communications module are coupled to each other, and whereby said antenna encloses said smart device display; receiving, when a card is tapped on said display, a signal by said antenna; transmitting, by said antenna, said signal to said processing and reading circuitry; processing, by said processing and reading circuitry, said signal to produce data; and transmitting, via said communications module, said produced data to a device external to said reader device.

Another embodiment provides a method to perform reading for a device comprising a display. Said method comprising providing an reader comprising an antenna, processing and reading circuitry, and a communications module, wherein said antenna, said processing and reading circuitry\ and said communications module are coupled to each other, and whereby said antenna encloses said device display; enabling said antenna to receive a signal when a card is tapped on said display; enabling said antenna to transmit said signal to said processing and reading circuitry; enabling said processing and reading circuitry to process said signal to produce data; and enabling said communications module to transmit said produced data to a device external to said reader.

BRIEF DESCRIPTION OF THE DRAWINGS

For a more complete understanding, reference is now made to the following description taken in conjunction with the accompanying Drawings in which.

DETAILED DESCRIPTION

Figure 1:
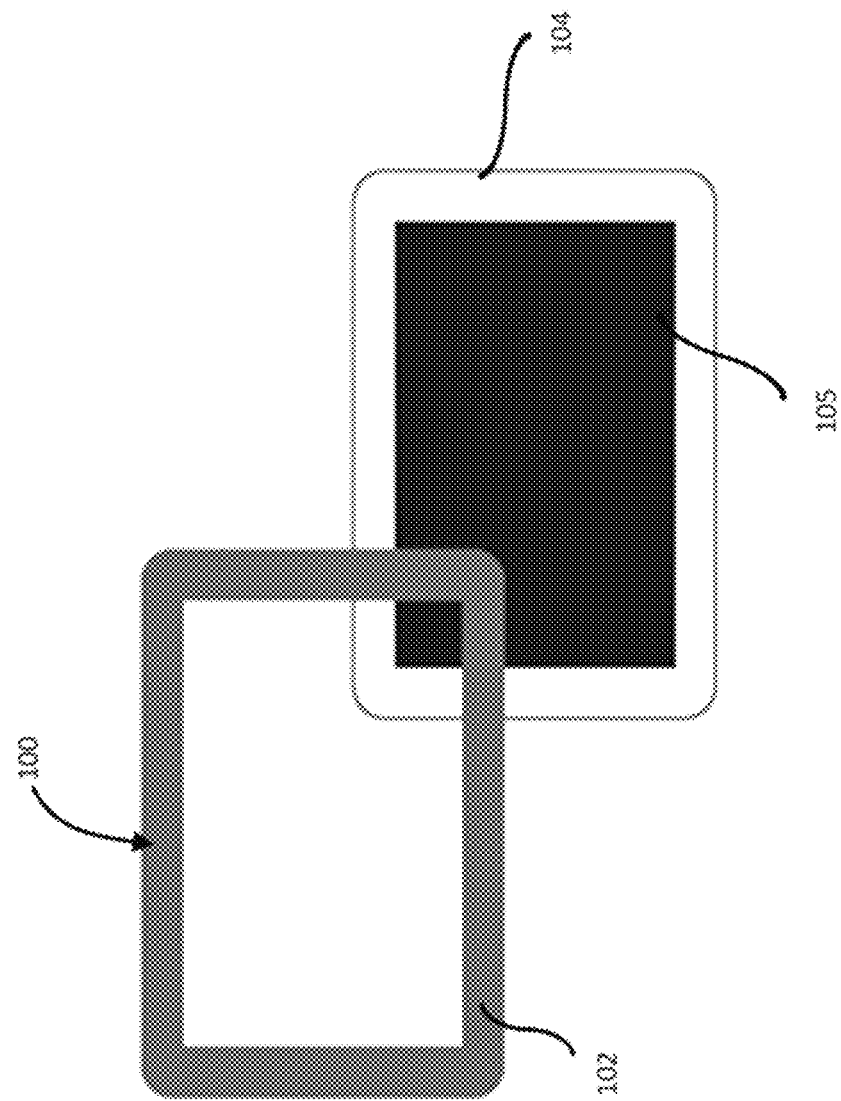
FIG. 1 illustrates an embodiment of a reader, a reader device, a near field communications (NFC) reader, or an NFC reader device to receive card payments via cards.

Referring now to the drawings, wherein like reference numbers are used herein to designate like elements throughout, the various views and embodiments of a system and method for a reader or an NFC reader device are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments. In the below description, the terms "reader" and "reader device" are used interchangeably.

FIG. 1 shows one embodiment of a system and method to enable merchants to receive card payments from consumers via tapping cards on a smart device screen, and which is standards compliant.

In FIG. 1, NFC reader device 100 comprises NFC-enabled rim overlay 102. Rim overlay 102 is made using, for example, plastic or any other suitable material and attaches to the rim of the smart device 104 using various attachment techniques. Smart device 104 is, for example, a smartphone or a tablet. In some embodiments, rim overlay 102 is attached to the rim of the smart device 104 using an adhesive attachment technique such as a touch fastener or Velcro®, double sided tape or glue. In other embodiments, the rim overlay 102 is attached to the rim of smart device 104 by click locking so as to hold it in place around the smart device 104. In other embodiments, the rim overlay 102 has a form fitting bezel for attachment to the bezel of smart device 104. Then, rim overlay 102 encloses display 105.

In some embodiments, NFC reader device 100 is also communicatively coupled to smart device 104. In further embodiments, NFC reader device 100 is electrically coupled to smart device 104 so as to draw power from smart device 104.

Figure 2A:
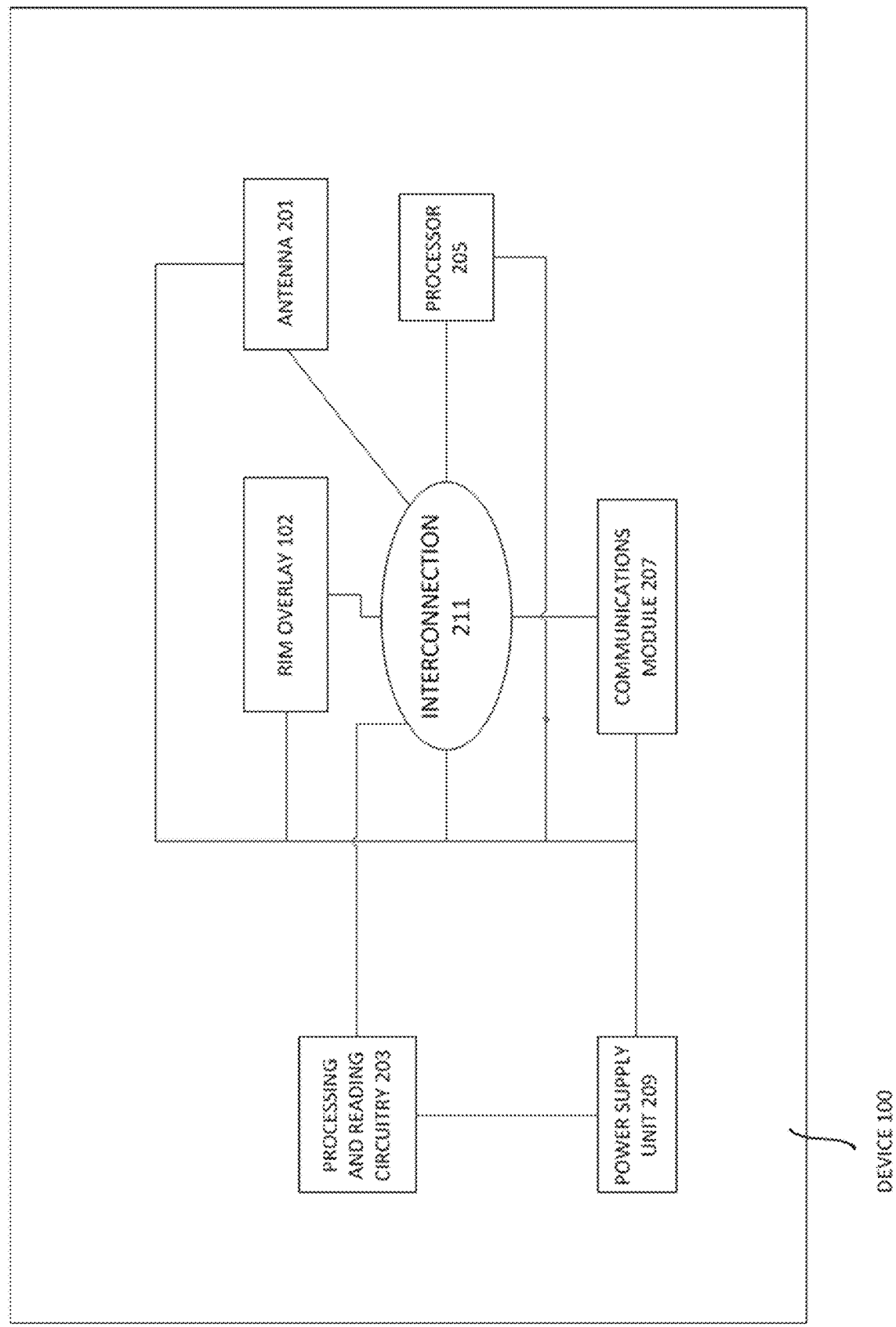
FIG. 2A illustrates a detailed embodiment of an NFC reader device.

FIG. 2A shows a detailed embodiment of NFC reader device 100. NFC reader device 100 comprises an antenna 201 such as an NFC/RFID/EMV antenna integrated into rim overlay 102. In some embodiments, the rim overlay 102 is made of plastic, and the antenna 201 is in a wire wound form, or on a printed circuit board (PCB), or takes the form of a flexible printed circuit board (FPCB) integrated into rim overlay 102. In some embodiments, ferrite materials are interposed between the smart device 104 and the antenna 201 in order to minimize undesired interactions between the antenna 201 and the smart device 104. In this way, the antenna forms a loop antenna which encloses the display 105.

NFC reader device 100 comprises processing and reading circuitry such as NFC/RFID/EMV processing and reading circuitry 203, to
  Receive signals from NFC/RFID/EMV antenna 201,
  Process signals received from NFC/RFID/EMV antenna 201, and
  Transmit signals to NFC/RFID/EMV antenna 201.

NFC reader device 100 further comprises a processor 205 to coordinate the overall operation of NFC reader device 100.

NFC reader device 100 also comprises communication module 207. This module is responsible for receiving signals from, and transmitting signals to, devices and systems external to NFC reader device 100, such as smart device 104. In one embodiment, communication module 207 comprises specialized processors to enable the operation of various communication protocols. Communication module 207 facilitates communications via, for example, at least one of wired and wireless connection techniques. In some embodiments, communication module 207 is configured to use communication techniques for close range communications known to those of skill in the art such as Universal Serial Bus (USB), Lightning, Thunderbolt, Firewire, Bluetooth and WiFi.

NFC reader device 100 also comprises power supply unit 209. Power supply unit 209 is coupled to the other components of NFC reader device 100 so as to supply power to these components. In some embodiments, power supply unit 209 comprises an alternating current (AC) adapter for connection to a mains supply. In some embodiments, power supply unit 209 comprises one or more batteries. In some embodiments, the one or more batteries comprise a rechargeable battery. In embodiments where power supply unit 209 is a rechargeable battery, power supply unit 209 is charged using:
  wired charging techniques known to those of skill in the art; or
  wireless charging techniques known to those of skill in the art, such as the Qi protocol.

In further embodiments, power supply unit 209 comprises one or more batteries and an AC adapter. In some of these embodiments, if power supply unit 209 is not connected to a mains supply, NFC reader device 100 is powered by the one or more batteries. In some of these embodiments, if power supply unit 209 is connected to a mains supply, then NFC reader device 100 is powered by the mains supply. In some of these embodiments, when power supply unit 209 is connected to a mains supply, NFC reader device 100 is powered by the one or more batteries and the one or more batteries are recharged. In other embodiments, some portion of the power is provided by the one or more batteries and the remaining portion of the power is provided by the mains supply. In some embodiments, the portions will depend on the battery charge level. In yet other embodiments, NFC reader device 100 is powered by the smart device 104.

Interconnection 211 electrically couples the components of NFC reader device 100 together. Interconnection 211 is created using techniques known to those of skill in the art.

In some embodiments, NFC/RFID/EMV processing and reading circuitry 203, processor 205, communication module 207, power supply unit 209 and interconnection 211 are located within rim overlay 102.

Figure 2B:
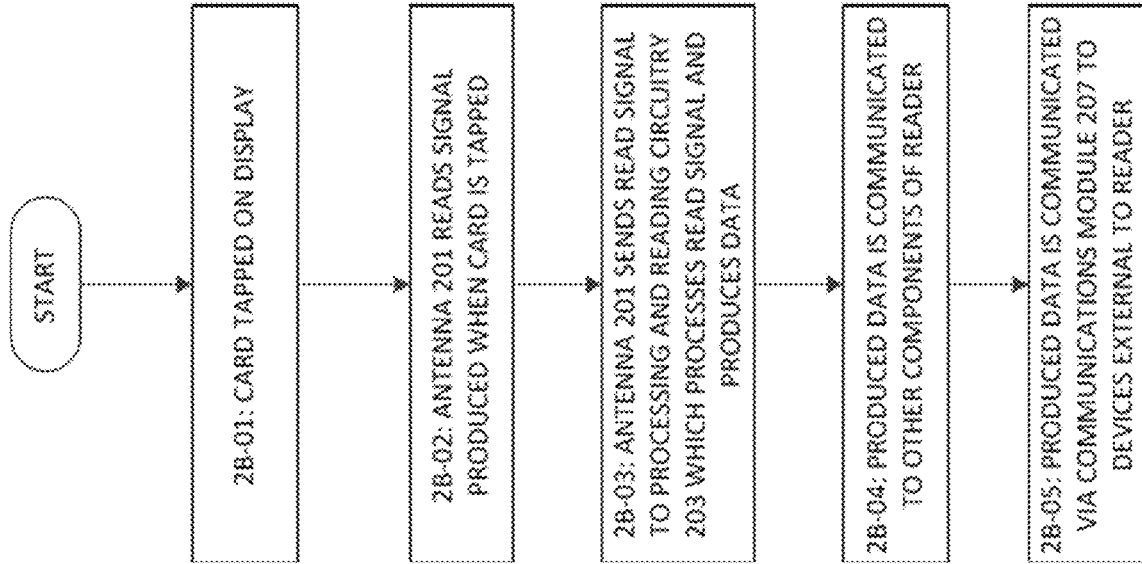
FIG. 2B illustrates an example embodiment of a process for reading a card.

FIG. 2B shows an example embodiment of a process for reading a card. When a user taps a card on display 105 in step 2B-01, signals are produced and read or received using NFC/RFID/EMV antenna 201 in step 2B-02. In step 2B-03, the read signals are sent from NFC/RFID/EMV antenna 201 to NFC/RFID/EMV processing and reading circuitry 203 where the signals are further processed and data is produced. In step 2B-04, the produced data is then communicated to the other components of NFC reader device 100 as required, for example, processor 205 and communications module 207. In step 2B-05, this processed data is further communicated by communications module 207 to devices external to NFC reader device 100, such as smart device 104 or other external devices or external servers.

Figure 3:
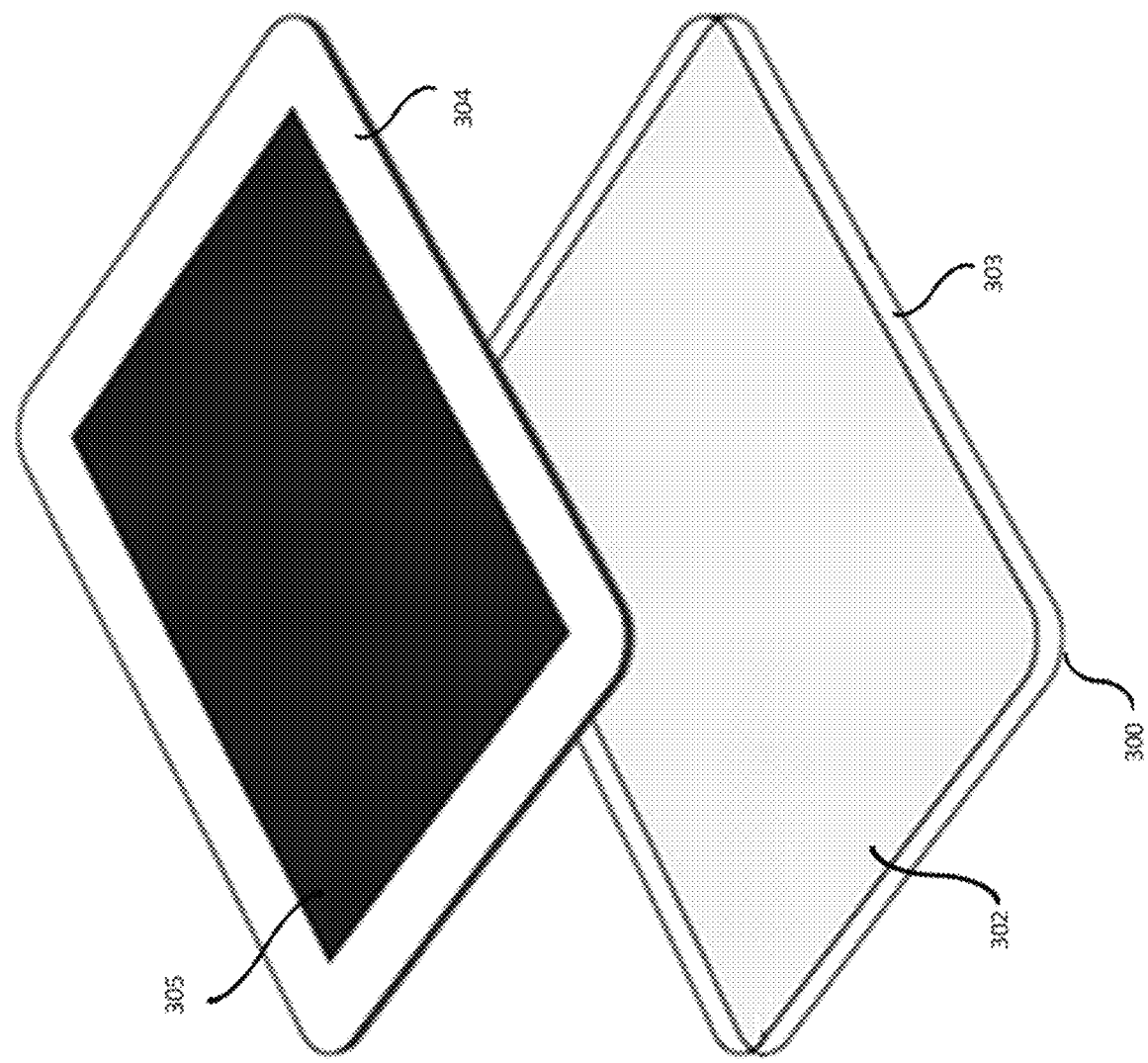
FIG. 3 illustrates another embodiment of an NFC reader device to receive card payments via cards.

FIG. 3 shows another embodiment of a system and method which is standards compliant and enables merchants to receive card payments via tapping cards on a smart device screen. In FIG. 3, smart device 304 comprises display 305. NFC reader device 300 comprises a protective sleeve 302, which comprises bezel 303. Protective sleeve 302 is attached to smart device 304, which comprises display 305. In some embodiments, sleeve 302 is attached to the rim of the smart device 304 using an adhesive attachment technique such as a touch fastener or Velcro®, double sided tape or glue. In other embodiments, the sleeve 302 is click locked to hold the smart device in between. In other embodiments, bezel 303 is a form fitting bezel and is pressed to fit or click on to the bezel of smart device 304.

Similar to NFC reader device 100 and as shown in FIG. 2A, NFC reader device 300 comprises an NFC/RFID/EMV antenna, NFC/RFID/EMV processing and reading circuitry, a processor, a power supply unit and a communications module. The functions of these components have been described previously with relation to FIG. 2A. However, the bezel 303 takes the place of the rim overlay 102.

In some embodiments, the NFC/RFID/EMV antenna is integrated into the bezel 303 of the sleeve 302. This is achieved via, for example, using a plastic housing for the bezel 303 and installing the antenna in wire wound form, or on a printed circuit board (PCB) or on an FPCB. The antenna is then a loop antenna which encloses the display 305. In some embodiments, ferrite materials are interposed between the smart device 304 and the antenna in order to minimize undesired interactions between the antenna and the smart device.

The components other than the NFC/RFID/EMV antenna are interconnected together and located within protective sleeve 302. In some embodiments, protective sleeve 302 is communicatively coupled to smart device 304. In some embodiments, protective sleeve 302 is electrically coupled to smart device 304.

A similar process to that described in FIG. 2B occurs for reading a card. When a consumer taps his or her card on the screen of smart device 304 similar to that shown in step 2B-01, the NFC/RFID/EMV antenna integrated into bezel 303 reads the signals produced similar to step 2B-02, and, similar to step 2B-03 communicates these signals to the NFC/RFID/EMV processing and reading circuitry, where the signals are further processed. Similar to the case for NFC reader device 100 and as in step 2B-04, the processed data is then communicated to the other components of NFC reader device 300 as required, for example the processor and the communications module. Similar to that shown in step 2B-05, this processed data is further communicated to a device external to the reader such as smart device 304.

Figure 4:
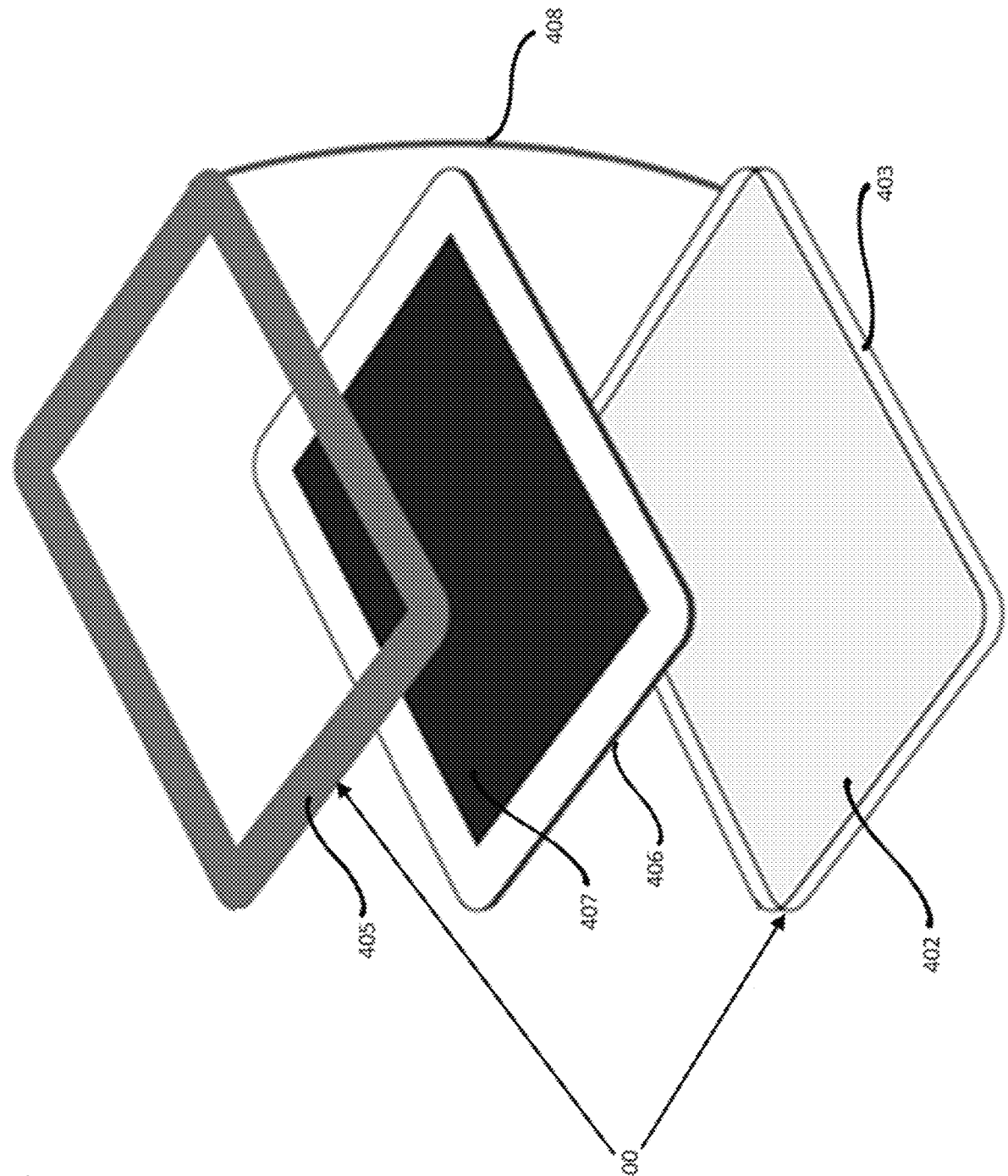
FIG. 4 illustrates another embodiment of an NFC reader device to receive card payments via cards.

FIG. 4 shows yet another embodiment of a system and method to achieve the aims as outlined above. In FIG. 4, NFC reader device 400 comprises protective sleeve 402 comprising bezel 403, and
NFC-enabled rim overlay 405.

In some embodiments, NFC-enabled rim overlay 405 is attached to the rim of the smart device 406 so as to enclose display 407. In some embodiments, rim overlay 405 is attached to the rim of the smart device 406 using an adhesive attachment technique such as a touch fastener or Velcro®, double sided tape or glue. In other embodiments, the rim overlay 405 is click locked to hold it in place around the smart device 406. In other embodiments, the rim overlay 405 has a form fitting bezel to either press fit or click on to the bezel of smart device 406.

In some embodiments, the NFC/RFID/EMV antenna is integrated into NFC-enabled rim overlay 405. In some embodiments, the overlay 405 is a plastic housing and the antenna is in wire wound form, or printed on a PCB or printed on an FPCB. In this way, the antenna forms a loop antenna which encloses display 407. In some embodiments, ferrite materials are interposed between the smart device 406 and the antenna in order to minimize undesired interactions between the antenna and the smart device 406.

In addition to the antenna, NFC reader device 400 comprises NFC/RFID/EMV processing and reading circuitry, a processor, a power supply unit and a communications module. These components are similar to those shown in FIG. 2A. The components other than the NFC/RFID/EMV antenna are distributed between the rim overlay 405 and protective sleeve 402 in a variety of possible ways. In some embodiments, protective sleeve 402 houses the components necessary for the operation of the NFC reader device 400 other than the NFC/RFID/EMV antenna. Other distributions of the remaining components are also possible.

Interconnection 408 electrically and communicatively couples protective sleeve 402 to the combination of NFC-enabled rim overlay 405. Interconnection 408 is, for example, a board to board connector, a board to FPCB connector, a cable, spring contacts, or any other technique known to those of skill in the art to enable a communicative and electrical coupling necessary for the operation of NFC reader device 400.

In some embodiments, rim overlay 405 is also communicatively coupled to smart device 406. In some embodiments, rim overlay 405 is also electrically coupled to smart device 406 so as to draw power from smart device 406.

In some embodiments, the protective sleeve 402 is communicatively coupled to smart device 406. In some embodiments, the protective sleeve 402 is electrically coupled to smart device 406 so as to draw power from smart device 406.

When a user taps a card on overlay 405, the NFC/RFID/EMV antenna receives or reads the signals produced, and communicates these signals to the NFC/RFID/EMV processing and reading circuitry, where these signals are processed to produce data. If the NFC/RFID/EMV processing and reading circuitry is located in, for example, protective sleeve 402, this is achieved using interconnection 408. Similar to the cases for NFC reader devices 100 and 300, the produced data is then communicated to the other components of the NFC reader device 400 as required, for example the processor and the communications module. In some embodiments, this produced data is further communicated to smart device 406.

In addition to smart devices, one of skill in the art would realize that NFC reader devices 100, 300 and 400 can be generalized for use with devices or systems other than smart devices which have display screens or monitors. These devices or systems include, for example, laptops, interactive kiosks and desktop computers.

In some embodiments, as part of the installation of the antenna, software is installed on the device before deployment. This software comprises, for example, an application or an "app". In some embodiments, the app is downloaded from an application store or marketplace such as the GOOGLE® PLAY® store or the APPLE APP STORE®. In some embodiments, the software or the app indicates to a user where to tap a card on, for example, displays 105, 305 and 407 of smart devices 104, 304 and 406 respectively.

Some of the above embodiments have been described with reference to NFC, RFID and EMV. It would be known to one of skill in the art that the above-described approaches are not limited to only these technologies.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A reader for capturing card data for a device during a transaction performed by the device, wherein the device comprises a display, the reader comprising:
 a processor configured to coordinate operations of the processor, an antenna, processing and reading circuitry, and a communications system of the reader;
 the antenna, communicatively coupled with the processor, configured to: read a signal produced when a card is tapped by a user on the display of the device during the transaction, and send the signal to the processing and reading circuitry;
 the processing and reading circuitry, communicatively coupled with the processor and the antenna, configured to receive the signal sent from the antenna, process the signal to produce data, and send the produced data to the communications system of the reader;
 the communications system, communicatively coupled with the processor and the processing and reading circuitry, configured to receive the produced data, and transmit the produced data to a device external to the reader as card data to be used to process the transaction, wherein:
 wherein the reader is attached to the device causing the antenna to enclose the display of the device.

2. The reader of claim 1, wherein the communication system comprises one or more processors configured to execute one or more communications protocols when transmitting the produced data to a device external to the system, the one or more communications protocols comprising one or more close range communications protocols, one or more network communication protocols, or a combination thereof.

3. The reader of claim 1, wherein the reader comprises a power supply that at least partially powers one or more components of the reader.

4. The reader of claim 3, wherein the reader is electrically coupled with the device to draw power from a power source of the device.

5. The reader of claim 4, wherein the power supply comprises one or more rechargeable batteries that are chargeable via power drawn from the power source of the device.

6. The reader of claim 3, wherein the power supply comprises one or more rechargeable batteries that are chargeable via an electrical connection to an external power source that is external to both the reader and the device.

7. The reader of claim 1, wherein the reader is comprised in a protective sleeve attached to a rim of the device, and the protective sleeve covers a side of the device opposite the display.

8. The reader of claim 7, wherein the protective sleeve comprises a bezel, the antenna is integrated into the bezel of the protective sleeve, and when the bezel of the protective sleeve engages a second bezel of the device, the antenna is caused to enclose the display of the device.

9. The reader of claim 1, further comprising a rim overlay with the antenna being integrated into the rim overlay;
 when the rim overlay is attached to a rim of the device, the antenna is caused to enclose the display of the device.

10. The reader of claim 9, further comprising:
 a protective sleeve with a bezel for attachment to a second bezel of the device, wherein when the bezel of the protective sleeve engages the second bezel of the device, the protective sleeve covers a side of the device opposite the display.

11. The reader of claim 10, wherein the antenna is comprised in the rim overlay, and the rim overlay further comprises a ferrite material interposed between the antenna and the device when the rim overlay is attached to the rim of the device.

12. The reader of claim 10, wherein the protective sleeve and the rim overlay are coupled with each other via an interconnection, wherein the interconnection electrically couples and/or communicatively couples the protective sleeve with the rim overlay.

13. The reader of claim 1, wherein the device is one of a smartphone, tablet, laptop, interactive kiosk, or desktop computer, and is the device external to the reader.

14. The reader of claim 1, wherein the device external to the reader comprises an external server computer system.

15. A method for capturing card data by a reader during a transaction performed by a device to which the reader is attached, wherein the device comprises a display, the method comprising:

coordinating, by a processor of the reader, operations of an antenna, processing and reading circuitry, and a communications system of the reader;

reading, by the antenna, a signal produced when a card is tapped by a user on the display of the device during the transaction, wherein when the reader is attached to the device, the antenna of the reader encloses the display of the device;

processing, by the processing and reading circuitry, the signal read by the antenna to produce data;

transmitting, by the communication system, the produced data to a device external to the system as card data to be used to process the transaction.

16. The method of claim 15, wherein the communication system comprises one or more processors that execute one or more communications protocols when transmitting the produced data to the device external to the system, the one or more communications protocols comprising one or more close range communications protocols, one or more network communication protocols, or a combination thereof.

17. The method of claim 15, wherein the device is one of a smartphone, tablet, laptop, interactive kiosk, or desktop computer, and is the device external to the reader.

18. The method of claim 15, wherein the device external to the reader comprises an external server computer system.

19. The method of claim 15, wherein the reader comprises a power supply that at least partially powers one or more components of the reader.

20. The method of claim 15, wherein the reader is comprised in a protective sleeve attached to a rim of the device, and the protective sleeve covers a side of the device opposite the display.

* * * * *